3,097,173
PROCESS OF PREPARING EMULSIONS USING POLYETHERTHIOETHER EMULSIFIERS
Hanswilli v. Brachel and Heinz Esser, Cologne-Sulz, Hans Holtschmidt, Cologne-Stammheim, and Gustav Sinn, Bergisch-Neukirchen, Germany, assignors to Farbenfabriken Bayer Aktiengesellschaft, Leverkusen, Germany, a corporation of Germany
No Drawing. Filed Aug. 26, 1958, Ser. No. 757,213
Claims priority, application Germany Aug. 30, 1957
5 Claims. (Cl. 252—311.5)

Polyethylene glycol ethers wherein the hydrophilic ether oxygen is combined with an organophilic aliphatic or aromatic radical have been known as non-ionic emulsifiers for a long time.

It has now been found that polyethers, in particular polyethylene glycol ethers, wherein some of the oxygen atoms are replaced by thioether groupings show outstanding emulsifying properties. In these compounds the bivalent sulphur atom owing to its organophilic properties adopts the function of the organophilic aliphatic or aromatic radicals.

The compounds to be used as emulsifiers according to the invention may be obtained, for example, by condensation of polyethylene glycols with dihydroxy-alkyl thioethers. There may be used, for example, thiodiglycol, $\beta,\beta'$-dimethyl-thiodiglycol, $\beta,\beta'$-diphenyl-thiodiglycol, the polythioether glycols formed by self condensation, and polythioether glycols obtained by the reaction of alkylene halides with alkali metal sulphides and glycol-chlorohydrin. As polyalkylene glycols there are used either polyethylene glycols, highly oxylated aliphatic, cycloaliphatic or aromatic monohydric or polyhydric alcohols.

The emulsifiers of the invention may further be produced by oxyethylation of polythioethers or polyetherthioethers containing free hydroxyl or mercaptan groups. Finally, the emulsifiers may also be obtained by simultaneous or successive copolymerisation of alkylene sulphides and ethylene oxides.

The emulsifiers of the invention are linear or branched compounds, the chains of which are interrupted at regular or irregular intervals by oxygen and sulphur atoms. In order to attain a sufficiently high water-solubility in the cold, polyether-thioethers are preferably used which contain at least one oxygen atom per 3 carbon atoms. These compounds should preferably contain at least one oxygen atom per sulphur atom. The molecular weight is more than 500, advantageously between 1500 and 15,000.

The aforesaid polyether-thioether exhibit an excellent action, when mineral oils, aromatic hydrocarbons and fatty oils are to be emulsified in water or if water is to be emulsified in these substances. Already at an emulsifier concentration of 0.5–5 percent homogeneous emulsions are obtained having a 50 percent organic phase which do not change even after standing for several days. When high-melting fats or waxes are to be emulsified, an emulsifier is generally used which is still soluble in water at a temperature which is higher than the melting temperature of the fat to be emulsified.

In comparison with the known emulsifiers, the emulsifiers of the present invention have the advantage that their emulsifying properties disappear by oxidation or alkylation of the sulphur; the organophilic bivalent sulphur is thus converted into the highly hydrophilic sulphonium, sulphoxide or sulphone grouping so that the emulsifier loses to a large extent its solubility in the organic phase. Emulsifiers of this type are of special interest for reactions of organic compounds which are carried out in emulsion since, upon completion of the reaction, the emulsion can be resolved without the emulsifier passing into the organic phase as is the case with ionic emulsifiers where the hydrophilic constituent of the emulsifier is removed by acidification, for example with salts of fatty acids or dehydro-abietic acid or by adjustment to an alkaline reaction, for example with oleylamine.

The emulsifiers may also be employed with satisfactory results for the finishing of textiles and for the compounding of pest control agents and for the production of cutting oils.

The aforesaid polyether-thioether wherein the sulphur atoms are in general regularly distributed over the whole molecule and wherein the hydrophobic centres are as small as possible, are of special importance for emulsifying softening agents, antioxidants or other assistants in the processing of natural rubber, synthetic rubber or plastic dispersions for dipped goods (gloves, balloons) from latex or latex mixtures. This is effected in such a manner that a suitable mould is first dipped in a coagulation solution such as the solution of a polyvalent salt, and subsequently in the latex mixture. Thus, part of the latex coagulates forming a film on the surface of the mould. To attain a satisfactory coagulation, the latex mixture should not be too stable since otherwise the coagulation is too much delayed or even prevented. In order to attain special effects such as soft vulcanisates with a low modulus, it is frequently necessary or desirable to add to the rubber or plastic dispersions liquid substances such as dibenzyl ether, mineral or other oils and waxes in the form of an emulsion. When known commercial emulsifiers are used for this purpose the whole latex mixture is often stabilised to such an extent with respect to the coagulating agent that a satisfactory working becomes difficult or even impossible.

The emulsifiers of the invention wherein the sulphur atoms are approximately regularly dispersed in the molecule and wherein the hydrophobic centres are as small as possible, do not, in spite of their excellent emulsifying action exert a stabilising effect on the latex mixture. Preferably condensation products of thiodiglycol and its substitution products containing low molecular weight substituents such as methyl or ethyl groups, with low molecular weight polyethylene glycol ethers such as octa-ethylene glycol, deca-ethylene glycol, or dodeca-ethylene glycol are applied. The condensation products of oxethylated butane-diols and oxethylated hexanediols with thiodiglycol have similar properties. In principle, the other emulsifiers of the invention are also suitable for this purpose, but their action is weaker.

The aforesaid polyether-thioether can also be applied for emulsifying chlorinated paraffin containing preferably 10–12 carbon atoms and 30–75% by weight of chlorine and having a molecular weight of preferably 400–550. These emulsions can be used for rendering articles of foam rubber, dipped goods, impregnated fabrics, paper, fleece or the like uninflammable.

The following examples serve to illustrate the invention without, however, limiting the scope thereof.

*Example 1*

Into a 5–10 percent aqueous solution of the polyether-thioether described below, the same quantity by weight of toluene was run through a thin jet. After thorough homogenisation, the emulsion was emptied into a narrow cylinder for checking its stability. No separation was observed even after standing for several days.

In a similar manner mineral oils, spindle oils, dibenzyl ether, edible oil, paraffin oil, ester plasticisers such as methylene-bis-thioglycolic acid dibutyl ester, benzyloctyl adipate, dibutyl phthalate or triphenyl phosphate, or fatty oils may be emulsified.

The polyether thioether used was prepared in the following manner:

415 grams of thiodiglycol and 13 grams of orthophosphoric acid were heated to 185° C. until 41 millilitres of water were distilled off, i.e. after about 30 to 60 minutes. 560 grams of polyethylene glycol of molecular weight 1750 were then added to the mixture and the mixture was heated to 185° C. for 2 hours in a vacuum at a pressure of 12 mm. Hg. A mixture of polyether-thioether glycols with an average molecular weight of 4700 was thus obtained.

*Example 2*

The emulsifiability of the following solvents or plasticisers was tested: mineral oil, toluene, dibenzyl ether and methylene-bis-thioglycol acid dibutyl ester. 20 parts of the emulsifying oil or solvent were emulsified with rapid stirring with 20 parts of a 1 percent, 3 percent, 6 percent or 10 percent aqueous emulsifier solution.

The emulsifiers were prepared according to the manner indicated in Example 1 from the following starting components:

(a) 0.48 mol of octaglycol and 1 mol of thiodiglycol,
(b) 0.4 mol of octa-ethylene glycol and 1 mol of thiodiglycol,
(c) 0.35 mol of octa-ethylene glycol and 1 mol of thiodiglycol,
(d) 2 mol of polyethylene glycol monomethyl ether (molecular weight 670) and 3 mol of thiodiglycol. After standing for several days, no separation took place.

*Example 3*

2.5 grams of the polyether-thioether used as emulsifier in Example 1 were dissolved with heating in 50 grams of a chlorinated paraffin containing about 72 percent by weight of chlorine and having a molecular weight of 500. The solution was run with vigorous stirring into an aqueous solution containing 5 percent by weight of the emulsifier of Example 1.

The emulsion obtained can be adjusted by means of the usual thickening agents to the desired viscosity and can be applied in the usual manner for rendering inflammable materials uninflammable.

We claim:

1. In a process for the preparation of an aqueous emulsion, the improvement which consists of employing as an emulsifying agent a polyether-polythioether obtained by heating a dihydroxyalkyl thioether and a member of the group consisting of polyethylene glycols, oxyethylated monohydric alcohols and oxethylated polyhydric alcohols in the presence of dehydrating catalysts, said polyether-polythioether containing more than two thioether groups and being employed in an amount of 0.5–10% by weight based on the weight of the emulsion.

2. In a process for the preparation of emulsions to be employed in the processing of latices for the manufacture of dipped articles, the improvement comprising employing as an emulsifying agent a polyether-polythioether obtained by heating a dihydroxyalkyl thioether and a member of the group consisting of polyethylene glycols, oxethylated monohydric alcohols and oxethylated polyhydric alcohols in the presence of dehydrating catalysts, said polyether-polythioether containing more than two thioether groups and being employed in an amount of 0.5–10% by weight based on the weight of the emulsion.

3. Process of claim 1 wherein said polyether-polythioether is prepared by condensing thiodiglycol with an oxethylated monohydric alcohol.

4. In a process for the preparation of an emulsion of chlorinated paraffin, the improvement comprising employing as an emulsifying agent a polyether-polythioether obtained by heating a dihydroxyalkyl thioether and a member of the group consisting of polyethylene glycols, oxethylated monohydric alcohols and oxethylated polyhydric alcohols in the presence of dehydrating catalysts, said polyether-polythioether containing more than two thioether groups and being employed in an amount of 0.5–10% by weight based on the weight of the emulsion.

5. The process of claim 4 wherein said polyether-polythioether is prepared by condensing thiodiglycol with an oxethylated monohydric alcohol.

References Cited in the file of this patent

UNITED STATES PATENTS

| | | |
|---|---|---|
| 2,518,245 | Morris et al. | Aug. 8, 1950 |
| 2,769,713 | Wilson | Nov. 6, 1956 |
| 2,828,220 | McWherter | Mar. 25, 1958 |
| 2,866,776 | Nummy | Dec. 30, 1958 |
| 2,900,368 | Stilmar | Aug. 18, 1959 |
| 2,905,720 | De Benneville et al. | Sept. 22, 1959 |
| 2,905,721 | De Benneville et al. | Sept. 22, 1959 |

FOREIGN PATENTS

| | | |
|---|---|---|
| 643,456 | Great Britain | Sept. 20, 1950 |